United States Patent [19]

Goldstein et al.

[11] 4,118,626
[45] Oct. 3, 1978

[54] GAMMA FLUX RESPONSIVE SELF-POWERED RADIATION DETECTOR

[75] Inventors: Norman P. Goldstein, Delmont, Pa.; William H. Todt, Elmira Heights, N.Y.

[73] Assignee: Westinghouse Electric Corp., Pittsburgh, Pa.

[21] Appl. No.: 771,144

[22] Filed: Feb. 23, 1977

[51] Int. Cl.² ............................................. G01T 1/22
[52] U.S. Cl. .................................... 250/370; 250/390
[58] Field of Search ................................. 250/370, 390

[56] References Cited

U.S. PATENT DOCUMENTS

| 3,787,697 | 1/1974 | Shields | 250/390 |
| 3,872,311 | 3/1975 | Goldstein et al. | 250/390 |
| 3,949,210 | 4/1976 | Eichinger et al. | 250/370 |

*Primary Examiner*—Davis L. Willis
*Attorney, Agent, or Firm*—W. G. Sutcliff

[57] ABSTRACT

A self-powered gamma flux sensitive detector has improved gamma sensitivity as a result of provision of a low density insulating means between the emitter and collector of the detector.

6 Claims, 1 Drawing Figure

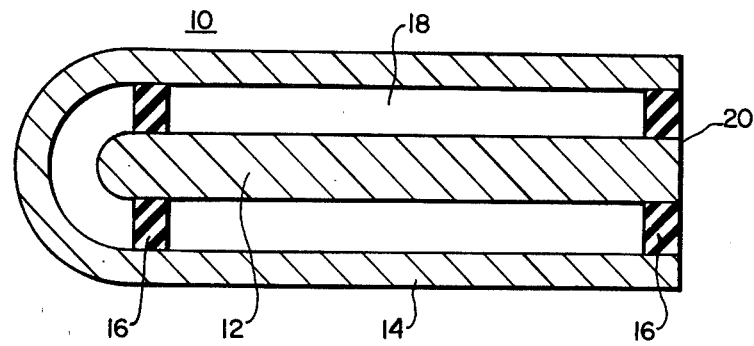

GAMMA FLUX RESPONSIVE SELF-POWERED RADIATION DETECTOR

BACKGROUND OF THE INVENTION

The invention relates to self-powered radiation detectors such as are used for nuclear reactor flux measurements. More particularly the invention relates to gamma sensitive self-powered detectors which are designed for in-core reactor flux measurements. The conventional self-powered detector includes a centralized conductive emitter, a dense metal oxide insulator disposed about the central emitter and a conductive collector sheet electrode disposed about the dense insulator. Such self-powered radiation detectors are described in U.S. Pat. Nos. 3,787,697 and 3,872,311.

A self-powered detector is one in which no operating potential be applied across the sensing electrodes. The output signal arises from the difference in the neutron or gamma response between the emitter and the collector electrodes. Recent developments have centered on gamma response self-powered detectors because of the fast response time of the device, and because of the slow burnup of the emitter material when disposed within the reactor core due to secondary effects of neutron absorption. These properties make gamma responsive self-powered detectors particularly suitable for satisfying Nuclear Regulatory Commission regulations requiring permanent in-core safety monitoring of large size reactors. Most such gamma responsive self-powered detectors utilize platinum as the emitter material with a dense aluminum oxide particulate insulator disposed about the platinum, and an Inconel steel sheath or collector electrode about the insulator. In a gamma field, electrons are forced out of the emitter towards the collector and also out of the collector towards the emitter. The net response of the detector consists of the difference between these currents. For a typical prior art self-powered detector of conventional length, a current of approximately $5 \times 10^{-8}$ amperes would be produced in a gamma flux field of $10^8$ Roentgens per hour. Such a current level is very difficult to measure in the reactor environment, because of the electrical noise which is typically present. In addition, error signals arise since the coaxial signal cables which connect the in-core detector to the exterior of the reactor and into the control panel area give rise to generation of error current signals from the gamma field. This is because the signal cable has the essential configuration of the self-powered detector itself and an error signal arises because of the differing response of the central conductor and the sheath conductor. It is possible to reduce or compensate for such signal cable gamma error signals, but in general it is desirable that the self-powered detector have an improved gamma sensitivity and a generally higher signal level.

Since such self-powered radiation detectors are designed for in-core reactor use there are practical overall outside diameter constraints imposed upon the detector design. These impose a practical limit upon the dimensioning of the emitter diameter which might be expected to offer some increase in sensitivity of the device. A fairly conventional overall outer diameter constraint of about 0.150" has become standard. It turns out that the current from gamma sensitive self-powered detectors increases very slowly with increasing emitter diameter. This observation along with the tight diameter size constraints imposed upon in-core detectors means that increasing the emitter diameter is not a viable method of improving the device response.

A method of significantly increasing the current from such self-powered detectors emerges from a detailed understanding of the current producing mechanism for such devices. The current from self-powered detectors is made up of the difference between two components. A positive current component is had from electrons reaching the collector from the emitter, and a negative component from electrons reaching the emitter from the collector. It has been discovered that the presence of the dense insulating material between the emitter and the collector tends to decrease the positive component and increase the negative component, thus resulting in a lower net detector response than would occur without the insulator. The electrons from the electrodes which stop in the insulator give rise to an electric field which causes return of some electrons to their electrode of origin and advances some electrons to the other electrode. For electrons from the emitter, some will stop in the insulator and return to the emitter and will not contribute to device current. Some electrons from the collector not heading toward the emitter will be stopped in the insulator, but will be advanced to the emitter by the electric field from the insulator. In the absence of an insulator those electrons not heading directly toward the emitter would miss it and hence not contribute to the current. The dense solid insulator tends to decrease the positive component and increase the negative component, resulting in lower net current.

SUMMARY OF THE INVENTION

It has been discovered that the gamma sensitivity of a self-powered detector can be significantly improved by replacing the conventional dense metal oxide insulator between the emitter and collector with a low density insulating means. A low density insulating means enables all electrons emitted from the emitter to reach the sheath or collector, while many of those emitted from the collector sheath will miss the emitter and travel to another part of the sheath contributing no current. The low density insulating means permits all of the electrons produced from each electrode to travel across the interelectrode space until reaching the opposite electrode. In this way all of the electrons produced by the gamma flux from the electrodes are involved in the current signal rather than a small fraction of them. The low density insulating means can comprise a gas such as air or can preferably be an evacuated space between the emitter and the collector.

BRIEF DESCRIPTION OF THE DRAWINGS

The sole FIGURE is a cross-sectional view of the improved gamma sensitive self-powered detector design of the present invention.

DESCRIPTION OF THE PREFERRED EMBODIMENTS

The present invention can best be understood by reference to the sole FIGURE. A self-powered radiation detector comprises a centralized gamma flux sensitive, high density elongated central conductive emitter 12. Emitter 12 is preferably formed of platinum. Axially disposed about the emitter 12 is a low gamma responsive tubular conductive collector sheath 14, which is typically formed of Inconel steel, Inconel is a trademark of the International Nickel Co. Insulating spacer means 16 are provided between the emitter 12 and the collector 14. The space or chamber between the emitter 12 and the collector 14 comprises a low density insulating means 18. Instead of a solid metal oxide insulator such as highly compacted alumina with a density of about 3 grams per cubic centimeter, a low density gaseous insulator such as air or preferably a completely evacuated space is provided as the insulating means 18 between the emitter and the collector. At one terminal end 20 of the detector 10 the collector sheath 14 is sealed off and this constitutes the projecting end of the detector. When the insulating means 18 is air, the opposed end of the radiation detector can be directly connected to a coaxial signal cable, as is conventionally done with the standard self-powered detector. When the space between the emitter and collector are evaluated, a hermetic seal means must be provided at such other end. The hermetic seal means permits continuation or connection of the emitter to the center wire of the coaxial signal cable, and connection of the sheath collector to the sheath of the coaxial cable. A solid low density medium may be used as the insulating means 18, but it must be stable upon exposure to high radiation flux and temperature. By low density is meant a material with a density less than about 3 grams per cc.

It has also been found that the gamma sensitivity of the device can be optimized for an optimum ratio of emitter diameter to collector inside diameter. This is very important because of the overall outside diameter limitation constraint imposed for in-core reactor usage. Thus, for a detector which has an overall outside diameter of 0.15", it has been found that the platinum emitter diameter is preferably about 0.06" in diameter with the insulator means or space between the emitter and the collector being about 0.02" and the collector sheath thickness is about 0.025". This means that the ratio of the platinum emitter diameter to the collector inside diameter is preferably about 0.6. A maximum gamma response signal output was observed when a variety of emitter diameter designs were considered. While it might be expected that the signal would be maximized when the emitter diameter was increased above 0.06", this was found not to be the case. It is thought this is so because while a larger diameter emitter would give off more electrons from the same gamma flux, it also interrupts or intercepts more electrons from the sheath. The emitter diameter to collector inside diameter ratio of about 0.6 accentuates the emitter current contribution. Exposure of the detector to very high energy average flux would mean this ratio should be increased because of the increased effect of such flux on the collector electrode.

We claim:

1. A gamma flux responsive self-powered radiation detector comprising a gamma flux sensitive, high density, conductive elongated central emitter, a low gamma responsive conductive tubular collector sheath spaced from and disposed about the central emitter, and low density insulating means between the emitter and the collector, wherein the insulating means density is less than about 3 grams per cubic centimeter.

2. The radiation detector set forth in claim 1, wherein the low density insulating means is an evacuated space.

3. The radiation detector set forth in claim 1, wherein the low density insulating means is a gas filled space.

4. The radiation detector set forth in claim 1, wherein the emitter is formed of platinum.

5. The radiation detector set forth in claim 4, wherein the ratio of the platinum emitter diameter to the collector inside diameter is about 0.6.

6. The radiation detector set forth in claim 5, wherein the platinum emitter diameter is about 0.060 inch, collector inside diameter is about 0.1 inch, and the collector outside diameter is about 0.150 inch.

* * * * *